United States Patent
Stamblesky et al.

[11] 3,883,424
[45] May 13, 1975

[54] METHOD AND APPARATUS FOR TREATMENT OF DOMESTIC WASTE WATER

[75] Inventors: Raymond P. Stamblesky, Mentor; William R. Jones, Eastlake, both of Ohio

[73] Assignees: John Kruger, Willoughby; Lee Friedabaugh, Concord Township; William N. Hogg, Gates Mills, all of Ohio ; part interest to each

[22] Filed: June 6, 1973

[21] Appl. No.: 367,647

[52] U.S. Cl. ............... 210/5; 210/15; 210/97; 210/138; 210/195; 210/197; 210/220
[51] Int. Cl. ............... C02c 1/08
[58] Field of Search ............... 210/4, 5, 7, 8, 14, 15, 210/195–197, 199, 202, 220, 260, 320, 152, 97, 104, 138

[56] References Cited
UNITED STATES PATENTS

| | | | |
|---|---|---|---|
| 3,119,770 | 1/1964 | Cunetta | 210/15 |
| 3,234,880 | 2/1966 | Hampton | 210/195 X |
| 3,419,146 | 12/1968 | Koulovatos | 210/195 X |
| 3,598,236 | 8/1971 | Nordlander | 210/195 X |
| 3,607,737 | 9/1971 | Gamer | 210/195 X |
| 3,709,792 | 1/1973 | Hampton | 210/195 X |
| 3,782,550 | 1/1974 | Materese | 210/152 X |

*Primary Examiner*—John Adee
*Assistant Examiner*—Robert H. Spitzer

[57] ABSTRACT

Domestic waste water is treated by aerobic action in a plurality of tank sections, moving from one to another as successive steps of treatment. In the first section the influent is received and air agitation is provided to supply oxygen and to break up large particles. The water flows to several successive sections from some of which it is both continuously recycled and also periodically recycled to the first section to complete as much of the treatment there as possible.

In one section an elongated settling compartment is provided to settle out the inert small particles. The discharge is by displacement from the final section.

The system also preferably has a positive displacement airlift transfer from at least one section to the next as the only means of communication between these sections to provide flow only when the treatment system is being supplied with air, and the system will back-up when the supply is removed thus requiring the user to provide the necessary repair to restore the proper functioning of the system.

10 Claims, 6 Drawing Figures

METHOD AND APPARATUS FOR TREATMENT OF DOMESTIC WASTE WATER

BACKGROUND OF THE INVENTION

This invention relates generally to the treatment of waste water, and more particularly to the treatment of residential waste water either from single residences or a group of residences. The invention is designed to operate adequately in areas where septic tanks often fail because of poor perculation quality of the soil or in areas where adequate leach beds or filter beds cannot be provided for one reason or another. Also, the invention performs substantially better than any septic system and leach bed combination and will provide a high quality effluent directly from the system without requiring any ground action such as filter beds or leach beds.

There have been many prior art waste treatment systems which have worked on the aerobic principle. However, many of these proposals did not function adequately and also were extremely expensive to install and required frequent and constant maintenance to maintain what efficiency they possessed.

SUMMARY OF THE INVENTION

According to the present invention a method and apparatus for treating residential waste water is provided in which a plurality of tank sections are utilized. The sections are interconnected to provide successive stations or steps in the treatment. Air agitation is utilized in the first step to provide the necessary agitation to break up the particles and also to supply the necessary oxygen as the first step for initiating and promoting aerobic bacteria action.

The waste water moves from this first tank section to successive tank sections in which the bacteria action is continued and the water clarified of solids; the waste water is recirculated between the various sections in such a manner that when the material has reached the final section there is minimal residual solid waste remaining with maximum treatment and the digestion of the waste having been accomplished resulting in a high quality effluent with low bacterias and residuals being discharged as effluent.

DESCRIPTION OF THE PREFERRED EMBODIMENT

Figure 1:
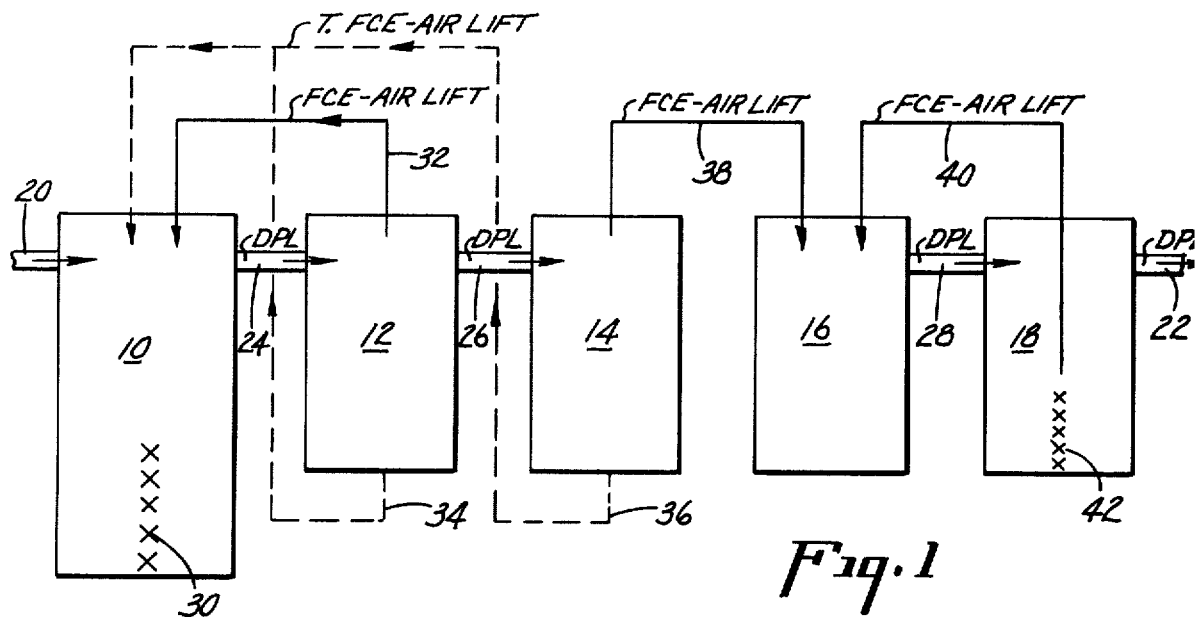
FIG. 1 is a schematic drawing showing diagramatically the treatment of residential waste water according to the present invention.

Referring now to the drawing, and for the present to FIG. 1, there is shown in this figure a diagramatic or schematic representation of what is basically a flow chart of the treatment of residential waste water according to the present invention. (As used herein the term residential waste water includes all of the normal wastes discharged from a single or multiple residences or groups of residence in normal activities through all of the liquid discharge lines from the house, sometimes generally referred to as residential sewage).

As shown in FIG. 1, there is an influent receiving section 10, a first intermediate section 12, a secondary intermediate section 14, a third intermediate section 16, and an effluent discharge section 18. An influent line 20 delivers the influent to the influent receiving section 10, and an effluent discharge line 22 discharges the final treated product. The effluent in the course of its treatment moves from the influent receiving section 10 successively to the intermediate sections 12, 14, and 16, and finally to the discharge section 18 from whence it is discharged.

There is a displacement feeding line 24 connecting the section 10 with the section 12 and a displacement feeding line 26 connecting the sections 12 and 14 and the displacement line 28 connecting the sections 16 and 18. The connection of the sections 14 and 16 is by an airlift device which will be described in detail presently. The influent is first received in the influent receiving section 10 where air agitation is provided thereto to both break up the particles and provide the necessary oxygen for the functioning of aerobic bacteria. It is in this section, which is shown diagramatically larger than the other sections, and which in fact normally will be the largest tank section, that the aerobic bacteria action in digesting the solid waste in the waste water is initiated and continued. Thus the air is supplied to this tank both to agitate the waste water therein, breaking up the solid waste contained to provide small particles with large surface area for the most effective bacteria action, and also to provide an abundance of oxygen required for aerobic bacteria action. In this agitation, there should be sufficient air delivered to provide the necessary oxygen and agitation, but not so much as to flocculate the solids and cause them to be suspended as fine particles.

From the influent receiving tank 10, the material or initially treated waste water flows through displacement pipe 24 by displacement to the first intermediate section 12. Thus the flow rate of the material from the section 10 to the section 12 is responsive to and proportional to the amount of material coming into the section 10. In the section 12, there is an airlift designated by the reference character 32 which continually skims the floating surface material from the surface of the section 12 and returns it to the influent receiving section 10. Thus any floating solids which find their way from the section 10 to the section 12 are continuously returned in a recycling manner so that they may be acted upon by the aerobic action in the section 10.

Also, in the section 12 the heavier particles will tend to settle in the bottom of the tank. These will, therefore, provide a source of supply for bacterial action. However, it is desirable to promote as much of the bacterial action in the section 10 as possible, and hence periodically a timed forced airlift, shown by the dotted line 34, returns the material from the bottom of section 12 to the influent receiving section 10, thereby periodically removing any settled solid particles and returning them to the section 10. This preferably takes place for a short period of time every 30 to 60 minutes, such as, for example, for two minutes out of every hour. Thus, during a major portion of each hour cycle solids are settling to the bottom of the tank 12 with increasing bacteria action; then this material is periodically returned to the first tank together with the bacteria acting thereon, which is in the nature of a seeding action. This assures a periodic new supply of bacteria to the first section 10.

From the second section 12, the material flows by displacement through displacement pipe 26 to the second intermediate section 14. This second intermediate section also acts as a settling and clarifying tank in any solids displaced thereto which are heavier than a liquid will settle to the bottom. A second timed airlift, designated by the dotted line 36, periodically recycles this material from the bottom of section 14 to the section 10 in a like manner and for a like purpose as recycling through the timed airlift 34 from the section 12 to the tank section 10. Thus, by the time the waste water has reached the stage of treatment in the second intermediate section 14 most of the floating material and heavy solid material has been recycled or returned to the influent receiving section 10. Thus the liquid in the section 14 will at this point have only very fine suspended solids therein, mostly in the nature of the biologically inert skeletal remains of the organisms which have died off after performing their digestion function in digesting the waste material.

The liquid from the section 14 is pumped by an airlift 38 to the tank section 16. The airlift 38 is so positioned in the tank that it will lift up the water only above a given preset level in the tank 14. Hence, there is a positive airlift from the section 14 to the section 16, but this positive airlift is only a lift of so much material as is displaced into section 14 from the section 12, which in turn is a function of the amount of material displaced from the section 10, which in turn is a function of the amount of influent delivered to the system. Thus, while there is a positive delivery by airlift from the section 14 to the section 16, there is a delivery only of the amount of material displaced by the incoming material.

In the section 16, which is basically a quiet tank, the fine particles remaining in the liquid are allowed to settle out on the bottom. These settling fines constitute a very small or minute amount of material, basically being biologically inert material constituted primarily by the skeletal remains of the bacteria which have completed their job of digesting virtually all of the incoming solid waste material.

The waste water flows by displacement from the section 16 through the displacement line 28 to the effluent discharge section 18. From the effluent discharge section 18 the material is discharged by displacement through the effluent line 22. However, even in the effluent discharge section 18 there may be a small amount of settling of any remaining particles, so a continuous airlift 40 is provided which recycles the material from the bottom or near the bottom of the tank section 18 to the section 16 to allow for a further settlement of the particles therein, thus confining principally all of the accumulated settlement to the tank section 16.

Also optionally a small amount of areation 42 may be provided to the material in the tank 18 as a means to insure a high dissolved oxygen content in this final treatment tank section to assure a completion of the aerobic bacteria action before the waste material is displaced through the effluent line 22. Normally however this is not required, the previous treatment being adequate to insure the completion of the aerobic bacteria action prior to the discharge of the effluent.

To summarize the actions that take place, the influent is received in the influent receiving tank section 10 from the influent line 20, wherein the waste water is strongly agitated by means of air to break up the solid particles to a small particulate size and also to supply the necessary oxygen for aerobic bacteria action. The aerobic bacteria action commences and goes on actively in the influent receiving tank 10. Material is delivered to the tank section 12 by displacement from the tank 10. The floating solid material is continuously returned by means of an airlift to the tank section 10 to insure the return of this material for continuous aerobic bacteria action. Also, the heavier and coarser solids settle to the bottom of the section 12 which will provide increasing growth of bacteria colonies therein. This material is periodically recirculated by means of an airlift to the tank section 10, thus returning solid material with bacteria colonies to this first section for rapid continuous aerobic action; also this prevents accumulation of solids in this section. The material is displaced from the section 12 to the tank section 14 where there is also a settling out of heavier particles which particles also in a similar manner will initiate and provide initial growth for bacteria in colonies. This material also is periodically returned to the tank section 10 to continue the bacteria action therein and prevent settling out of solids. The remaining material in the tank 14 is almost completely free of any solid material which material is delivered by an airlift to the tank section 16. In this tank section, the very fine particles are allowed to settle out which fine particles are almost completely inert material, these being skeletal remains of the bacteria. Thereafter, further clarified liquid is then moved by displacement through displacement line 28 to the influent discharge section 18 from which it is moved by displacement to the effluent discharge line 22. Also, the material is recycled from the bottom of the tank 18 to the tank 16 so that the tank 16 is the only place where any solids continuously collect, and because of the complete nature of the treatment there is just a small amount of collected solids in this tank. Hence, according to the present invention a very effective waste treatment system is provided which will receive influent material, and through successive stages treat the material in confined tank sections by means of aerobic bacteria with the final discharge being essentially completely treated effluent of stream quality having high dissolved oxygen content, and low biological oxygen demand and suspended solids counts. In its basic functioning, the invention confines as much of the activity as possible to a first tank section, and utilizes at least two successive tank sections to clarify the liquid, returning continuously and/or intermittently the floating or settled particles, so that clarification of the waste continues as it progresses through the various sections until finally an essentially clarified liquid, substantially completely treated by aerobic action, is discharged.

Figure 2:
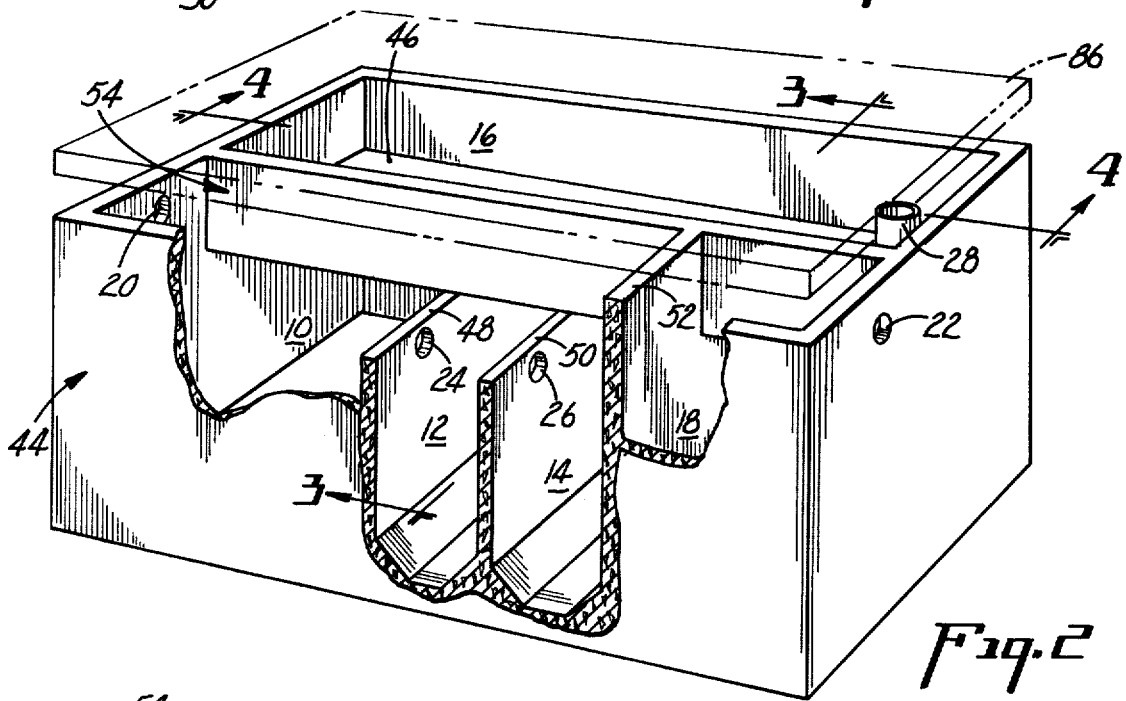
FIG. 2 is a perspective view of the tank member of the device according to the present invention.
Figure 3:
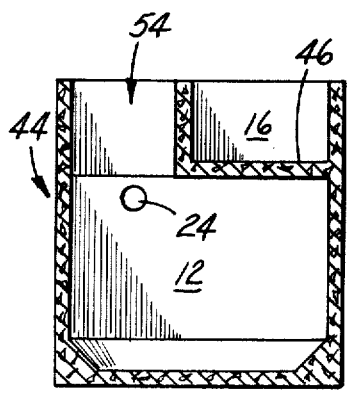
FIG. 3 is a sectional view taken substantially along the plane designated by the line 3—3 of FIG. 2.
Figure 4:
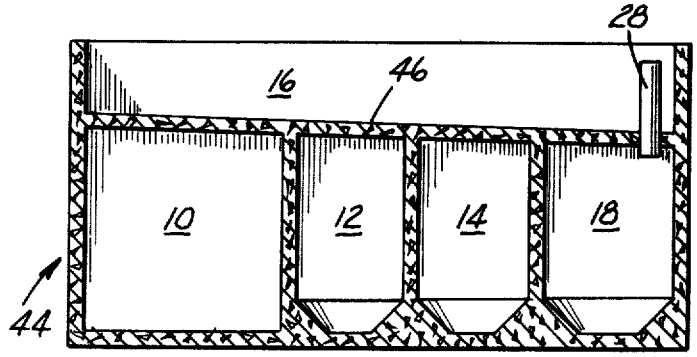
FIG. 4 is a sectional view taken substantially along the plane designated by the line 4—4 of FIG. 2.
Figure 5:
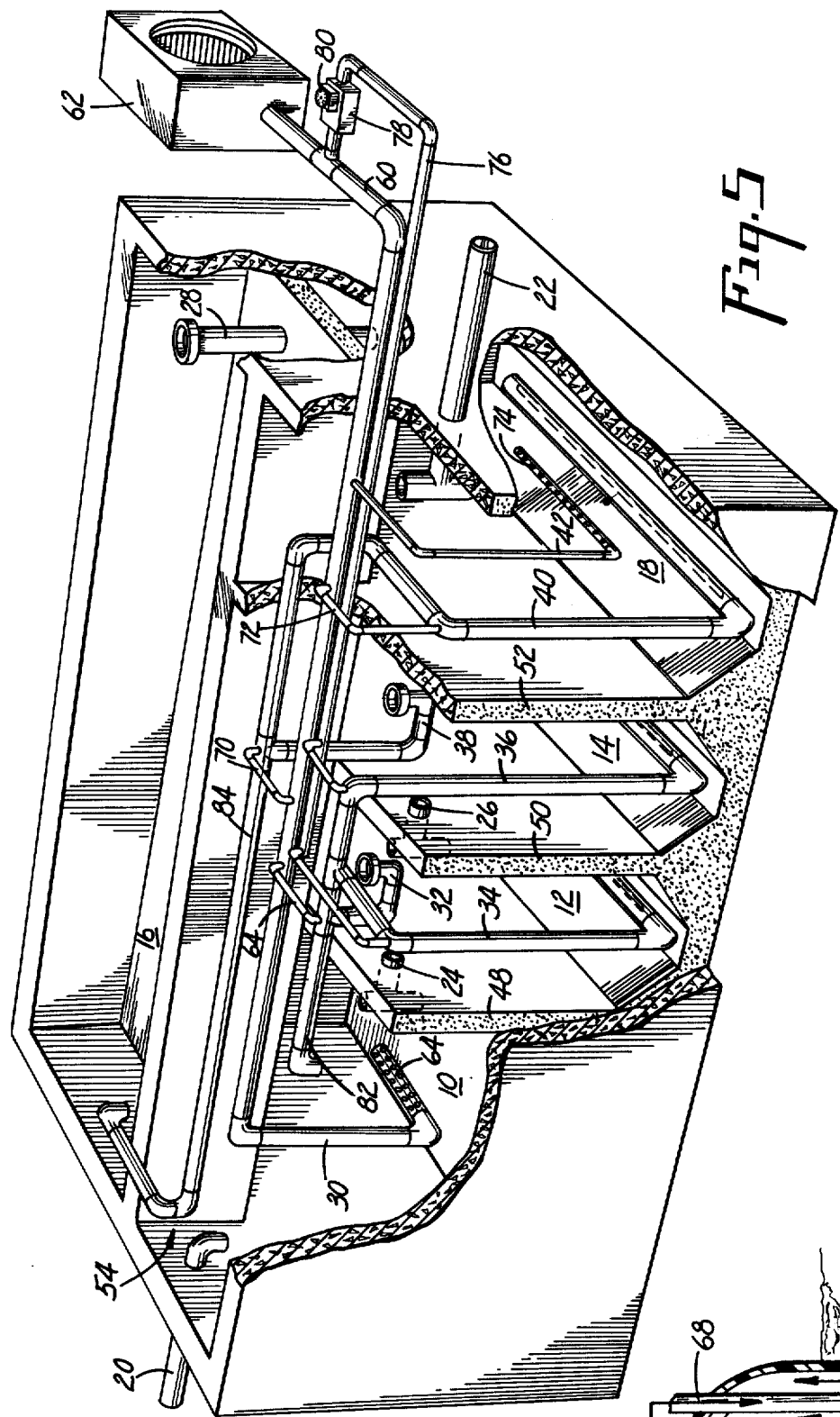
FIG. 5 is a perspective view similar to FIG. 2 showing the tank with the associated piping therein connected to the necessary control means.
Figure 6:
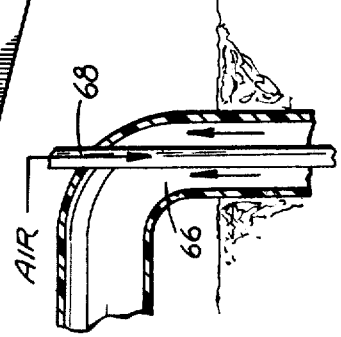
FIG. 6 is a partial sectional view showing an air lift construction utilized in this invention.

Referring now to FIGS. 2 through 6, a physical tank structure and associated components are shown which is the preferred apparatus according to this invention for preforming the preferred method of treatment according to this invention. As can best be seen in FIGS. 2 through 4, a concrete tank member 44 is provided which is cast and shaped to form the tank sections 10, 12, 14, 16, and 18, as designated therein. The influent receiving line 20 and the discharge line 22 are also cast in the tank as well as the delivery lines 24, 26, and 28. As can be seen in FIG. 2, the tank sections 10, 12, 14, and 18 are deep tank sections divided by divider walls. The section 16 is a cast section overlying a portion of each of the sections 10, 12, 14, and 18. This section is cast with a sloping bottom or floor 46. The sections 10 and 12 are divided by a divider wall 48, the sections 12 and 14 are divided by a divider wall 50, and the sections 14 and 18 are divided by a divider wall 52. The divider wall 52 extends up a sufficient distance that the tank 14 cannot overflow into the tank 18 for a purpose which will appear presently. However, as indicated previously, the tank sections 10 and 12 are connected by displacement line 24 and the tanks 12 and 14 are connected by displacement line 26. The tank 16 is connected to the tank 18 by displacement line 28 in the nature of a stand pipe which will cause the water to flow from the tank 16 to the tank 18 when the level in the tank 16 exceeds the height of the stand pipe 28. This tank is long and relatively shallow to facilitate the settling out of the very fine particles which remain in the liquid.

The entire concrete tank member is generally rectalinear in shape with the tank sections 10, 12, 14, and 18 underlying the tank section 16. Also, adjacent to tank 16 and above the tanks 10, 12, 14, and 18, is a space 54 for the necessary piping to provide for the airlift and air agitation functions of the device. While the piping can overlie the walls 48 and 50, it will normally be passed through and sealed in wall 52. Provided in this space is a main air line 60 which supplies the air for the agitation and the airlifts which air is received from a blower shown schematically as 62. At one end of the air line 60 the air agitator 30 is provided which is in the form of an air bar 64, submerged within the tank section 10 near the bottom thereof with apertures therein to allow the air to escape and perform the agitation and aeration function. The airlift 32 is operated by a take off pipe 64 connected to line 60. This airlift as all the other airlifts is merely a large diameter pipe into which the liquid is allowed to flow, and a smaller diameter pipe inserted therein to which air is supplied. This is shown diagramatically in FIG. 6, wherein a large diameter pipe 66 is shown with a smaller diameter pipe 68 inserted therein. By providing air pressure in the pipe 68, the water in the pipe 66 will be caused to rise and flow through the pipe 66 to wherever it is conducted. This is a simple airlift principle.

The main air supply pipe 60 also operates the airlift 38 from a take off pipe 70, airlift 40 from the take off pipe 72, and the aerator 42 in the form of a small diameter bar 74 submerged in the tank section 18. An auxiliary air pipe 76 is also provided which is adapted to operate the airlifts 34 and 36 which auxiliary air pipe 76 is controlled by a solenoid valve 78 which in turn is connected to a timer 80. Thus the airlifts 32, 38, and 40, as well as the agitators 30 and 42, are continuously operated, whereas the airlifts 34 and 36 are intermittently operated by means of the timer 80 operating the solenoid valve 78.

As can be seen, the airlifts 32, 34, and 36 all connect to return pipe 82 and airlifts 38 and 40 connect to delivery pipe 84. Hence, the operation of the device when air is continuously supplied to the main air line 60 is as described with reference to FIG. 1; i.e. the influent comes to the tank section 10 and overflows therefrom through displacement pipe 24 to the tank section 12; air agitation is provided continuously to the tank section 10; also the airlift 32 operating near the surface of the tank section 12 continuously returns the surface material of the tank section 12 to the tank section 10; the airlift 34 operating near the bottom of tank section 12 periodically according to the timer schedule returns material to the return pipe 82; the material flows by displacement from the tank 12 to the tank 14; periodically the material from the bottom thereof is returned by airlift 36 to the return pipe which empties into tank section 10; also continuously the material above a certain level in the tank 14 is delivered by the airlift 38 to the tank section 16; and the water will flow from the tank 16 to the tank 18 through the stand pipe 28 when the level therein is greater than the height of the stand pipe 18; also the airlift 42 will continuously recycle or recirculate the water from the tank section 18 to the tank section 16.

Under some conditions it may be desirable to return the surface material from the tank section 14 to tank section 10, in which case a continuous airlift similar to the lift 32 in tank 12 could be employed in tank 14.

A cover 86 (see FIG. 2) is provided which overlies the entire tank member 44 and if desired can be sealed around the upper edges. This then will provide a positive seal preventing any overflow from the tank section 14 and hence tank section 12 and 10 into the tank section 18 or into the tank section 16. Hence, by virtue of the airlift 38, there must be a positive continuous flow of air to lift the material from the tank section 14 to the tank section 16. This is a positive safety shut off feature, that in the event of a power interruption interrupting the necessary air for the operation of the tank properly, there will not be an overflow of the material from the initial treatment sections into the final treatment sections and into the effluent line. Therefore, when there is a power failure, the person owning the installation will know it will be necessary to immediately have the unit repaired with an air source resupplied or the device will back up and be inoperative. In any event, the positive sealing of the tank section 14 from the tank section 18 and the location of the tank section 16 preventing flow from the tank section 14 to either of the successive tanks in the absence of positive air being supplied is a safety feature which will act as a warning to require immediate restoration of any malfunctioning of the device and prevent untreated or partially treated effluent from entering the effluent line. Also, it should be noted that all of the operation of the device is completely without any mechanical parts within the tank structure, the only parts being the blower seleniod valve and timer, all of which are removed from the tank and not subject to the corrosive and fouling action thereof.

It is to be understood that the method and apparatus have been described in their preferred embodiment utilizing a five section tank structure of a particular configuration. This is the preferred and optimum arrangement as are the specific recycling schedules and arrangements which provide the optimum treatment results to the residential waste water. However, it is envisioned that the basic principles involved here could be preformed in a system having less than five sections such as four or even three although they will be more imperfectly performed. Basically however, what the system requires is an influent receiving tank section with air agitation provided thereto to both agitate the material in the tank to break up the solid and also provide the necessary oxidation for aerobic bacteria action. Also an effluent discharge tank section must be provided from which the effluent is to be discharged. Additionally, at least one intermediate tank section must be provided which will receive the material from the influent receiving tank section and means must be provided to at least periodically recycle the untreated material from this intermediate tank section to the effluent receiving section; and means must be provided to deliver partially treated effluent material from the intermediate section to the effluent discharge section. All this results in areation treatment with clarification of the effluent and return of the solids. At least one and preferably two additional intermediate tank sections for a total of five tank sections, however, are much to be preferred to insure as complete a treatment as possible with as much clarification of the liquid as possible for the optimum effluent characteristics.

What is claimed is:

1. A device for treating residential waste water comprising, tank means having a plurality of separate tank sections including an influent receiving section, an effluent discharge section, and at least one intermediate section, means to deliver influent to said influent receiving section, means to provide air agitation to the waste water in said influent receiving section, means to discharge water above a given level responsive and proportional to water received in said discharge section from said effluent discharge section, means interconnecting said influent receiving section each of said intermediate sections and said discharge section to provide fluid flow from said influent receiving section to said intermediate sections and to said effluent discharge section, return means to at least periodically return a portion of the waste water in at least one intermediate section to the influent receiving section, further characterized by the means interconnecting two successive sections including air lift means to positively deliver waste water above a given level from one section and responsive and proportional to water delivered to the unit to the next succeeding section as the only interconnection therebetween and operative by the means to provide air agitation whereby flow through and out of the unit is porportional to the intake, but flow through is halted when the means to provide air ceases to function.

2. The invention as defined in claim 1 wherein said return means includes air lift means to continuously return a portion of the waste water from the surface of the intermediate section directly connected to the influent receiving section to said influent receiving section.

3. The invention as defined in claim 1 wherein said return means includes air lift means and timing means there for to periodically return the waste water at regular periodic intervals for a predetermined time.

4. The invention as defined in claim 1 wherein there are at least two intermediate sections, and wherein said return means includes air lift means to continuously return waste water to said influent receiving section from the surface of the intermediate section connected thereto.

5. A method of treating residential waste water comprising the steps of, providing a plurality of separate tank sections, including an influent receiving section, an effluent discharge section, and at least one intermediate section, delivering influent to said influent receiving section, air agitating the material in the influent receiving section, providing fluid flow from said influent receiving section to an intermediate section responsive and proportional to influent flow to the influent receiving section, at least periodically returning a portion of the material to the influent receiving section from the intermediate section connected thereto, delivering material from the intermediate section to the discharge section responsive and proportional to the material delivered to the intermediate section, and discharging effluent from the effluent discharging section above a given level therein responsive and proportional to the material therein received, further characterized by the flow from one section to the next succeeding section being a positive delivery of waste water above a given level and responsive and proportional to the material received therein as the only fluid connection therebetween and operative by the means providing air agitation whereby the flow through and out the discharge is proportional to the intake as long as air is provided but flow through is halted when the air means ceases to function.

6. The invention as defined in claim 5 wherein there are air lift means to positively deliver waste water above a given level in one section to the next succeeding section as the only communication therebetween.

7. The invention as defined in claim 5 wherein waste water is returned at periodic intervals to the influent receiving section from an intermediate section.

8. The invention as defined in claim 5 wherein there are at least two intermediate sections, and the waste water is continuously returned to the influent receiving section from the surface of the intermediate section connected thereto.

9. The invention as defined in claim 5 wherein there are three intermediate sections, and the waste water is returned continuously and intermitantly to said influent receiving section from at least one of said intermediate sections.

10. A device for treating residential waste water comprising, tank means having a plurality of separate tank sections including an influent receiving section, an effluent discharge section, and at least one intermediate section, means to deliver influent to said influent receiving section, means to provide air agitation to the waste water in said influent receiving section, means to discharge water above a given level from the effluent discharge section, means interconnecting said influent receiving section with each of said intermediate sections and said discharge sections to provide fluid flow from said influent receiving section to said intermediate sections and to said effluent discharge section, return means to at least periodically return a portion of the waste water in at least one intermediate section to the influent receiving section, further characterized by one of the sections subsequent to said influent receiving section being disposed to overlie portions of at least two of the remaining sections and being accessible from the top of said device for periodic cleaning thereof, said one section being relatively shallow and long, the length being substantially more than the depth thereof and being free of air agitation to promote settling therein.

* * * * *